United States Patent
Hong et al.

(10) Patent No.: US 9,950,249 B2
(45) Date of Patent: Apr. 24, 2018

(54) ELECTRONIC DEVICE, ELECTRONIC TESTING SYSTEM, AND METHODS THEREOF

(71) Applicant: National Taiwan Normal University, Taipei (TW)

(72) Inventors: Jon-Chao Hong, Taipei (TW); Ming-Yueh Hwang, Taipei (TW); Kai-Wen Tai, Taipei (TW); Chi-Ruei Tsai, Taipei (TW); Kai-Hsin Tai, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 15/266,053

(22) Filed: Sep. 15, 2016

(65) Prior Publication Data
US 2017/0095731 A1 Apr. 6, 2017

(30) Foreign Application Priority Data
Oct. 2, 2015 (TW) .............................. 104132531 A

(51) Int. Cl.
| | |
|---|---|
| G09G 5/00 | (2006.01) |
| A63F 9/18 | (2006.01) |
| G06F 1/16 | (2006.01) |
| G06F 3/01 | (2006.01) |
| G09B 7/07 | (2006.01) |
| G09B 7/02 | (2006.01) |
| A63F 9/24 | (2006.01) |

(52) U.S. Cl.
CPC ............ *A63F 9/183* (2013.01); *G06F 1/1694* (2013.01); *G06F 3/017* (2013.01); *G09B 7/02* (2013.01); *G09B 7/07* (2013.01); *A63F 2009/2485* (2013.01)

(58) Field of Classification Search
CPC ............ A63F 2009/2485; A63F 9/183; G06F 1/1694; G06F 3/017; G09B 7/07
See application file for complete search history.

(56) References Cited

U.S. PATENT DOCUMENTS

| | | | | |
|---|---|---|---|---|
| 2014/0108927 A1* | 4/2014 | Vaidya | .................. | G06F 1/1694 715/708 |
| 2014/0327655 A1* | 11/2014 | Avrahami | ............. | G06F 1/1694 345/175 |

* cited by examiner

*Primary Examiner* — Insa Sadio
(74) *Attorney, Agent, or Firm* — Birch, Stewart, Kolasch & Birch, LLP

(57) ABSTRACT

An electronic device includes a display unit, an input unit, a memory unit, a sensor unit, a communication unit, and a control unit. The display unit is configured to display a question and answers corresponding to the question. The input unit is configured to allow user selection of one of the answers. The sensor unit is configured to detect movement of the electronic device. The control unit is configured to control the memory unit to record the one of the answers and to determine whether the movement meets a predetermined condition of shaking after the user selection is received by the input unit, and to control the communication unit to transmit the one of the answers when it is determined that the movement meets the predetermined condition.

14 Claims, 12 Drawing Sheets

Still answering: 10

FIG.9 remaining survivors: 4

FIG.10

ELECTRONIC DEVICE, ELECTRONIC TESTING SYSTEM, AND METHODS THEREOF

CROSS-REFERENCE TO RELATED APPLICATION

This application claims priority of Taiwanese Patent Application No. 104132531, filed on Oct. 2, 2015.

FIELD

The disclosure relates to an electronic testing system and a method, and more particularly to an electronic device, an electronic testing system, a method to be implemented by the electronic device, and a method to be implemented by the electronic testing system.

BACKGROUND

In a conventional electronic testing system, an answer will be transmitted immediately after a user selects the answer, leaving no room for the user to reconsider his/her selection. In another conventional electronic testing system, the selected answer is transmitted after a predetermined time period has lapsed. While this mechanism gives the user opportunity to change his/her answer, it takes longer to finish an entire game.

SUMMARY

Therefore, an object of the disclosure is to provide an electronic device, and an electronic testing system that can alleviate at least one of the drawbacks of the prior art.

According to the disclosure, the electronic device includes a display unit, an input unit, a memory unit, a sensor unit, a communication unit, and a control unit. The display unit is configured to display a question and a plurality of answers corresponding to the question. The input unit is configured to allow user selection of one of the answers. The sensor unit is configured to detect movement of the electronic device. The control unit is electrically coupled to the display unit, the input unit, the sensor unit, and the communication unit. The control unit is configured to control the memory unit to record the one of the answers and to determine whether the movement of the electronic device as detected by the sensor unit meets a predetermined condition of shaking after the user selection is received by the input unit, and to control the communication unit to transmit the one of the answers when it is determined that the movement of the electronic device meets the predetermined condition.

According to another aspect of the disclosure, an electronic testing system includes a master device, and a plurality of participant devices.

Each of the participant devices includes a control unit, an input unit, a sensor unit, a memory unit, a display unit, and a communication unit. The display unit is configured to display a question and a plurality of answers corresponding to the question. The input unit is configured to allow user selection of one of the answers. The sensor unit is configured to detect movement of the participant device. The control unit is electrically coupled to the display unit, the input unit, the sensor unit, and the communication unit. The control unit is configured to control the memory unit to record the one of the answers and to determine whether the movement of the participant device as detected by the sensor unit meets a predetermined condition of shaking after the user selection is received by the input unit, and to control the communication unit to transmit the one of the answers as a response when it is determined that the movement of the participant device meets the predetermined condition.

The master device includes a processing module, a communication module, and a storage module. The storage module is configured to store a correct answer corresponding to the question. The processing module is configured to receive the responses transmitted by the participant devices via the communication module, and to determine whether each of the responses matches the correct answer so as to determine a score for one of the participant devices from which the response is received.

Another object of the present disclosure is to provide methods to be implemented by an electronic device and the electronic testing system.

According to yet another aspect of the disclosure, a method to be implemented by an electronic device includes the following steps:

(A) displaying a question and a plurality of answers corresponding to the question;

(B) after receipt of user selection of one of the answers, determining whether movement of the electronic device meets a predetermined condition of shaking; and (C) when it is determined in step (B) that the movement of the electronic device meets the predetermined condition, transmitting the one of the answers.

According to still another aspect of this disclosure, a method to be implemented by an electronic testing system that includes a plurality of participant devices and a master device includes the following steps:

(a) by each of the participant devices, displaying a question and a plurality of answers corresponding to the question;

(b) by each of the participant devices, after receipt of user selection of one of the answers, determining whether movement of the electronic device meets a predetermined condition of shaking;

(c) by each of the participant devices, when it is determined in step (b) that the movement of the electronic device meets the predetermined condition, transmitting said one of the answers as a response to the master device;

(d) by the master device, upon receipt of the responses from the participant devices, determining whether each of the responses matches a correct answer so as to determine a score for one of the participant devices from which the response is received.

BRIEF DESCRIPTION OF THE DRAWINGS

Other features and advantages of the disclosure will become apparent in the following detailed description of the embodiment (s) with reference to the accompanying drawings, of which:

FIGS. 9, 10, 11 and 12 are schematic diagrams illustrating exemplary interfaces di splayed by a master device of the electronic testing system;

DETAILED DESCRIPTION

Figure 1:
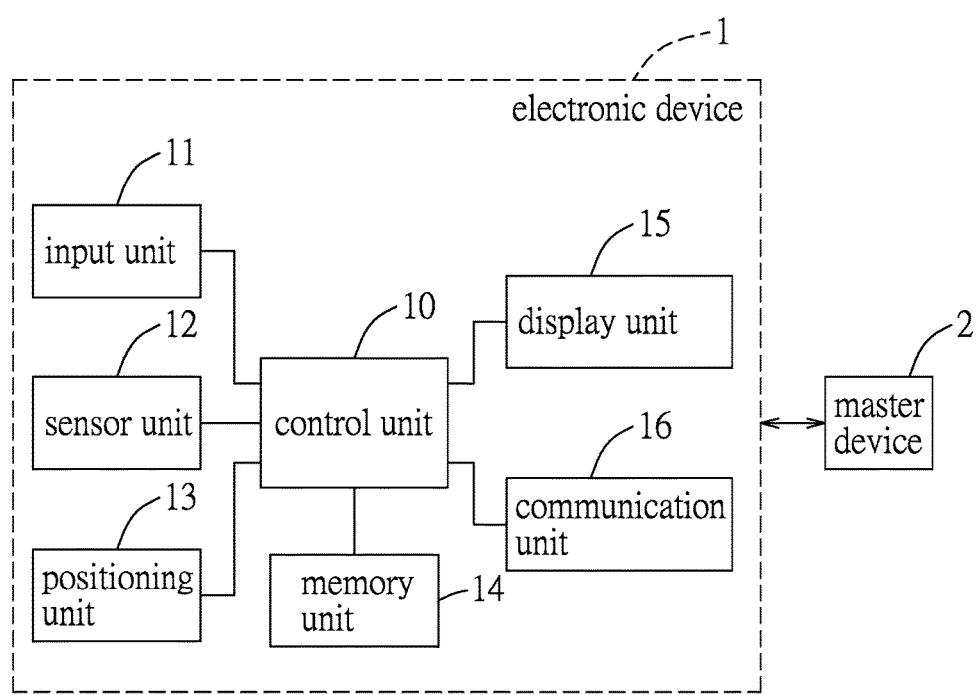
FIG. 1 is a block diagram illustrating an electronic device according to a first embodiment of the disclosure.
Figure 2:
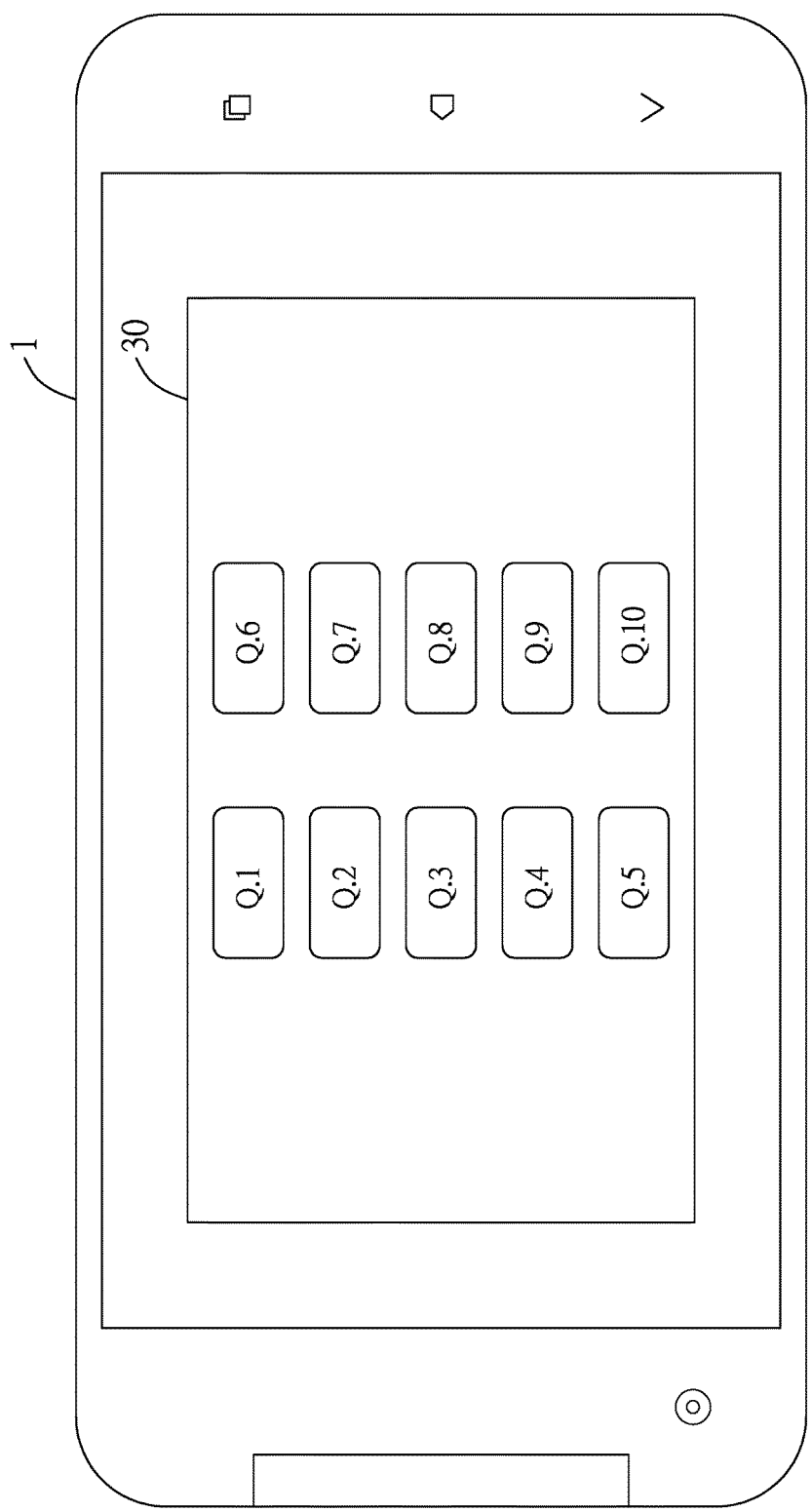
FIGS. 2, 3, 4, 5, 6 and 7 are schematic diagrams illustrating exemplary displays of an interface outputted by the electronic device.
Figure 3:
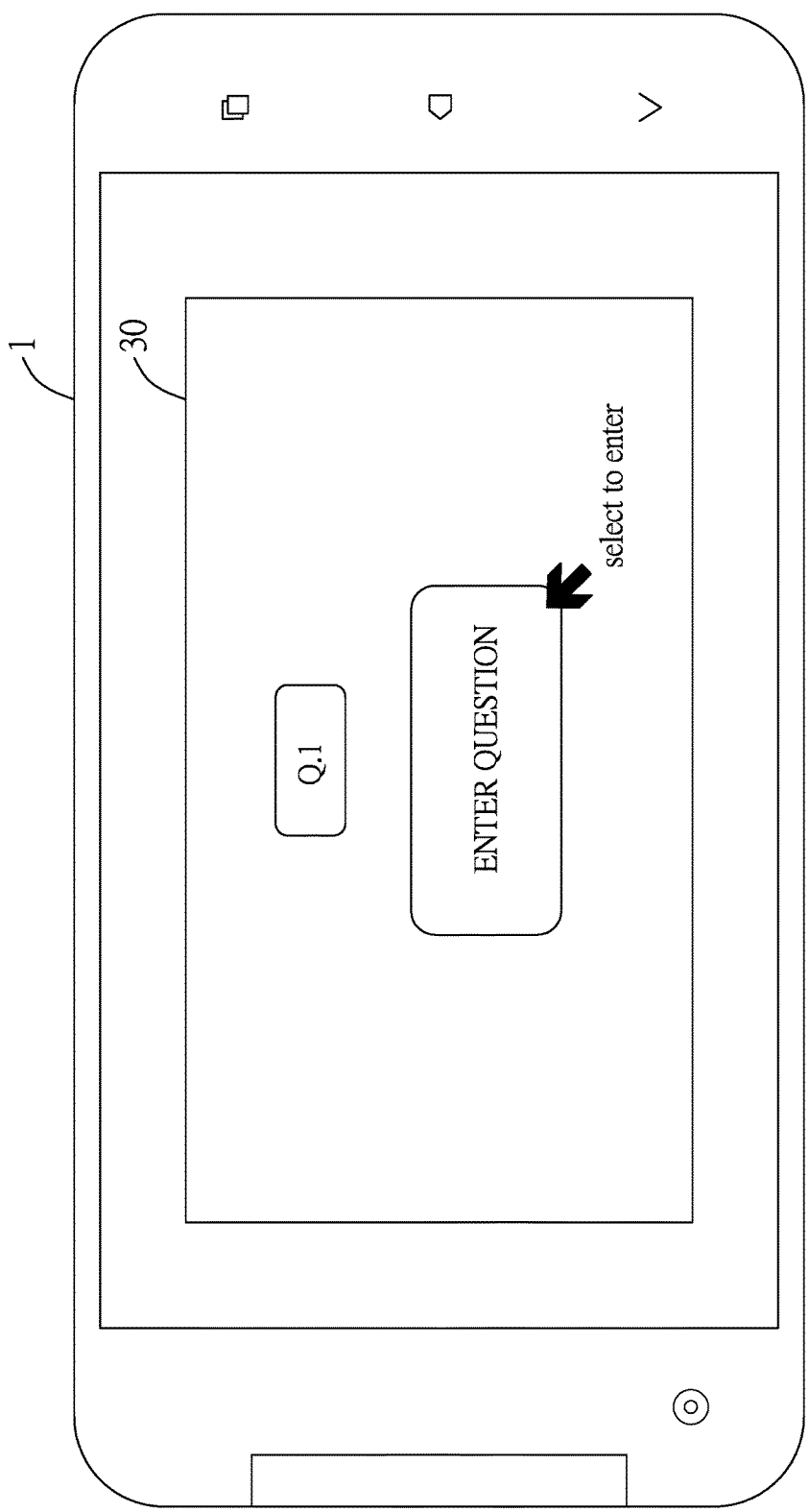
Figure 4:
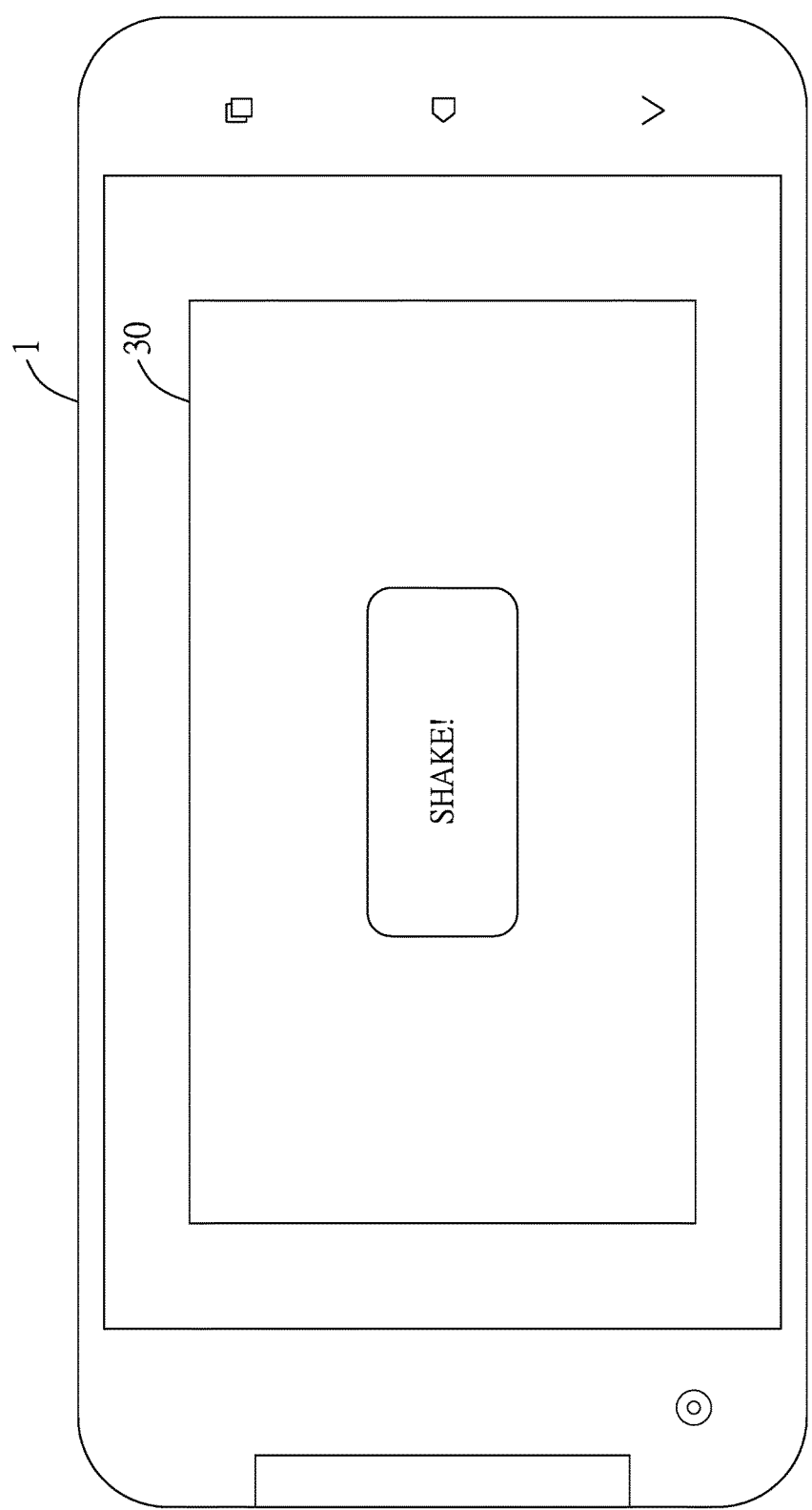
Figure 5:
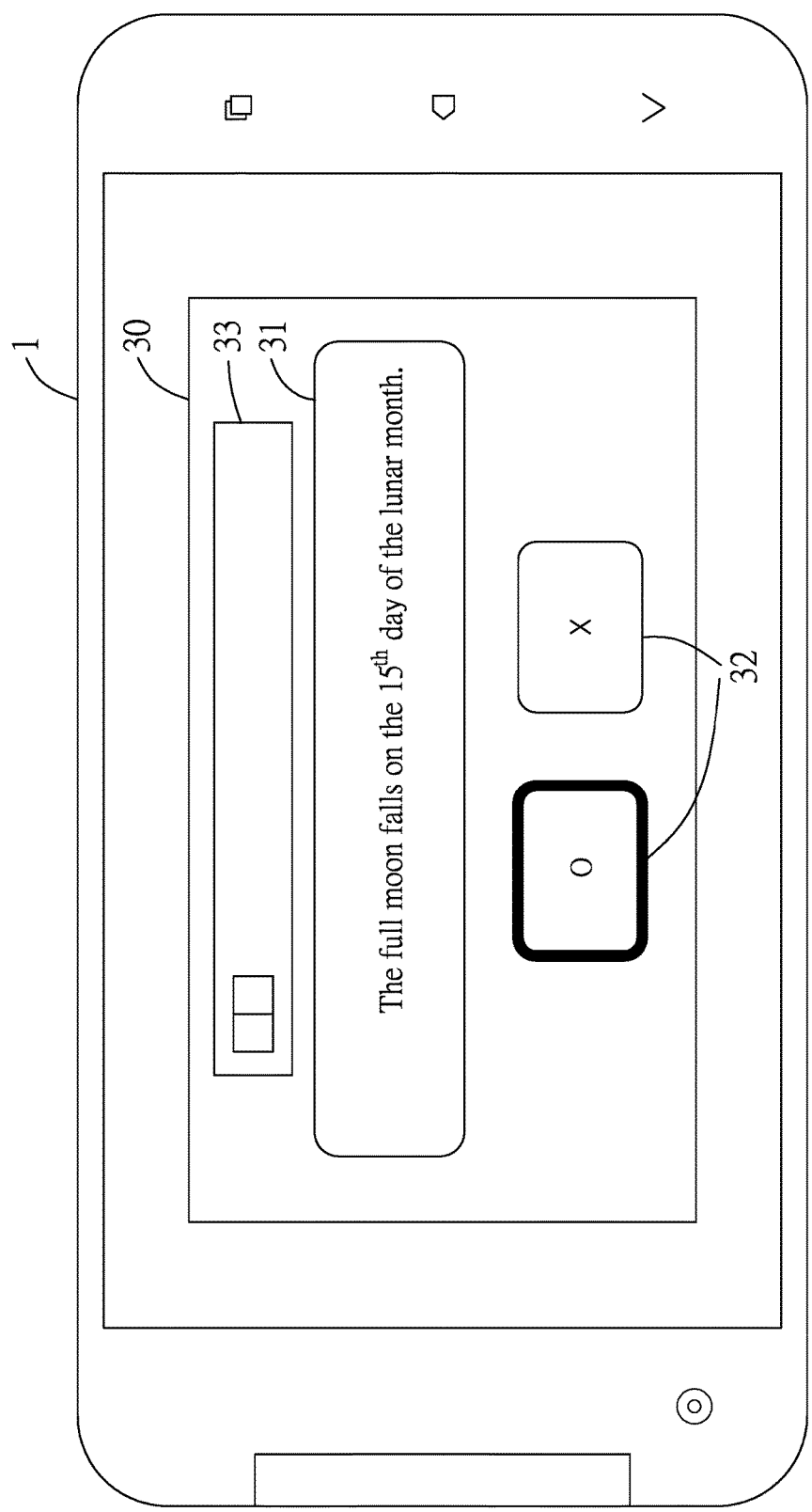
Figure 6:
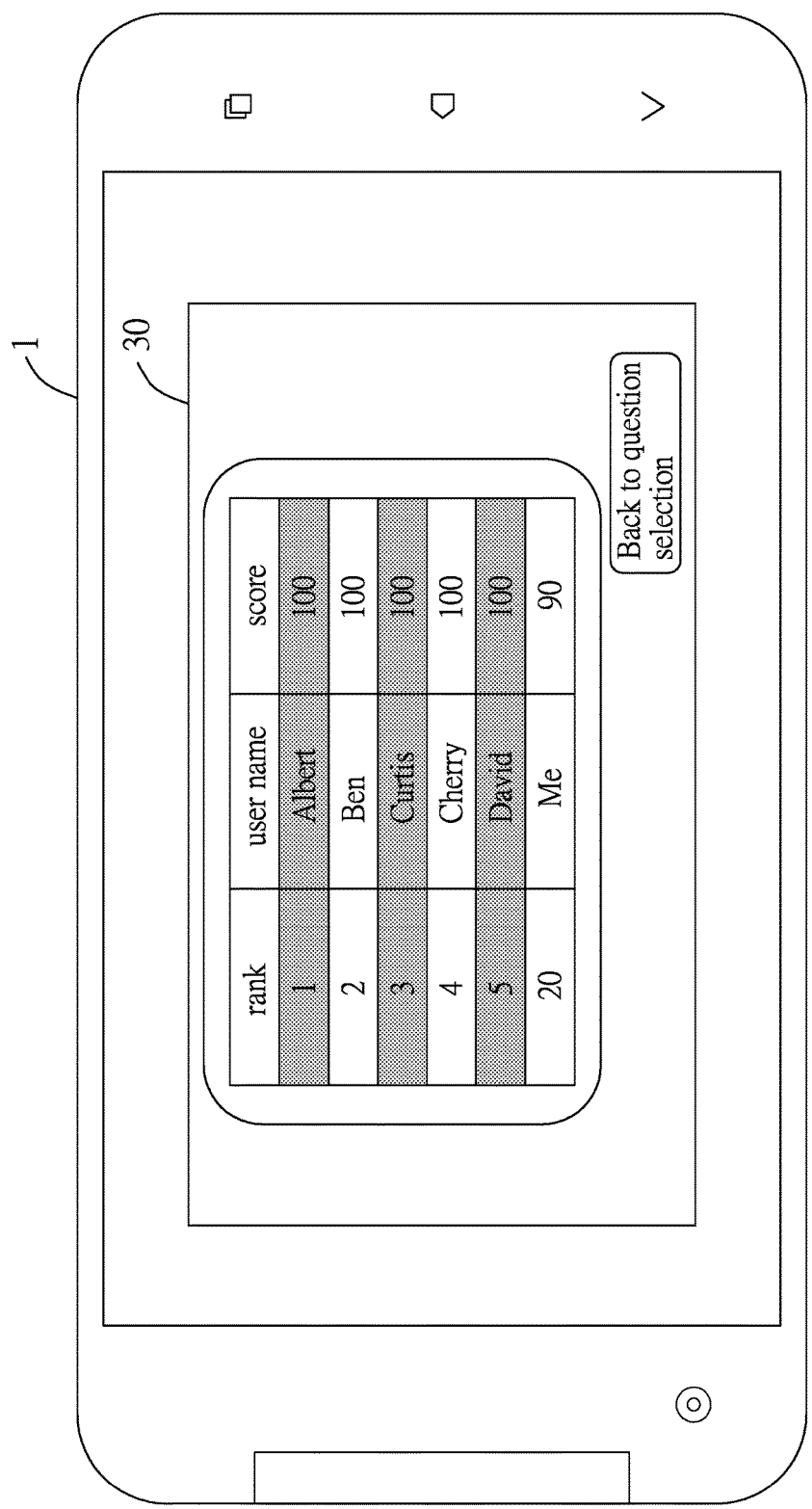

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment according to this disclosure is described below.

An electronic device 1 operates with a master device 2. The electronic device 1 communicates with the master device 2 via means of: short-range wireless communication (e.g., NFC (near field communication)), a network provided by a communication service provider, telecommunication network, etc. The electronic device 1 is a device for a user (not shown) to easily handle or use, such as a computer device, a communication device, etc. The electronic device 1 includes a control unit 10, an input unit 11, a sensor unit 12, a memory unit 14, a display unit 15, and a communication unit 16.

The display unit 15 is configured to display a question and a plurality of answers corresponding to the question.

The input unit 11 is configured to allow user selection of one of the answers, and may for example be a touch input device, a keyboard, etc.

The sensor unit 12 is configured to detect movement of the electronic device 1. For example, the sensor unit 12 may be a g-sensor, an accelerometer, an optical sensor, etc.

The positioning unit 13 is configured to generate position information associated with a position of the electronic device 1.

The communication unit 16 can communicate using, for instance, means of short-range wireless communication (e.g., NFC (near field communication)), a network provided by a communication service provider, telecommunication network, etc.

The memory unit 14 is for example, an HDD (hard disk drive), a flash memory, etc.

The control unit 10 is electrically coupled to the display unit 15, the input unit 11, the sensor unit 12, the memory unit 14, and the communication unit 16. The control unit 10 has established therein a predetermined condition of shaking, and is configured to control the memory unit 14 to record the one of the answers selected by the user (hereinafter referred to interchangeably as the "selected answer") and to determine whether the movement of the electronic device 1 as detected by the sensor unit 12 meets a predetermined condition of shaking after the user selection of the selected answer is received by the input unit 11. When it is determined that movement of the electronic device 1 meets the predetermined condition, the control unit 10 further controls the communication unit 16 to transmit the selected answer to the master device 2. The control unit 10 is configured to control the display unit 15 to display another question and a plurality of answers corresponding to said another question after the communication unit 10 transmits the selected answer corresponding to the question.

Namely, after the user uses the input unit 11 to select one of the answers for a current question, the user would need to shake the electronic device 1 as a confirmation of the selection of the answer. When the control unit of the electronic device 1 determines that the movement of the electronic device 1 meets the predetermined condition of shaking (based on detection made by the sensor unit 12), the control unit 10 controls the communication unit 16 to transmit the selected answer to the master device 2. Then, the control unit 10 controls the display unit 15 to display a next question and a plurality of answers corresponding to the next question for user selection.

In one embodiment, the sensor unit 12 is an accelerometer, and the predetermined condition is met when a sum of vibration amplitudes in three axes according to output (detection result) of the accelerometer is greater than a predetermined threshold.

In another example, the sensor unit 12 is an image sensor, and the predetermined condition is met when the control unit 10 determines that an image sensed by the image sensor conforms to a predetermined shaking image.

Referring to FIGS. 2 to 6, the user registers and takes an exam on a website platform that serves as the master device 2. The control unit 10 (see FIG. 1) controls the display unit 15 (see FIG. 1) to display a plurality of question items (e.g., Q.1 to Q.10) in an interface 30 for the user to select therefrom. After the user selects one of the question items, for example, Q.1, the control unit 10 controls the display unit 15 to show "ENTER QUESTION" on the interface 30 for user selection (see FIG. 3). Once the user selects "ENTER QUESTION", the control unit 10 controls the display unit 15 to show "SHAKE!" on the interface 30 to notify that the user could shake the electronic device 1 to obtain content corresponding to the question item (see FIG. 4). To receive the content of the selected question item, Q.1, the user shakes the electronic device 1, which is sensed by the sensor unit 12. When it is determined by the control unit 10 that the shaking event of the electronic device 1 meets the predetermined condition, the control unit 10 controls the display unit 15 to display a question 31, for example, "The full moon falls on the $15^{th}$ day of the lunar month", and answers 32 corresponding to the question 31 for user selection (see FIG. 5). A bar graph 33 may also be displayed on the interface 30 to indicate a number of questions the user has answered correctly thus far. For the purpose of illustration only, two grids are depicted in the bar graph 33 in FIG. 5 to indicate that two questions have been correctly answered by the user thus far. By the end of the exam, if the user has correctly answered all questions, the bar graph 33 would have full grids. After the user finishes answering all questions, the control unit 10 controls the display unit 15 to display a table in the interface 30 indicating an overall ranking with user names and scores so the user can know his/her performance in comparison with other users who have completed the same exam (see FIG. 6).

Figure 7:
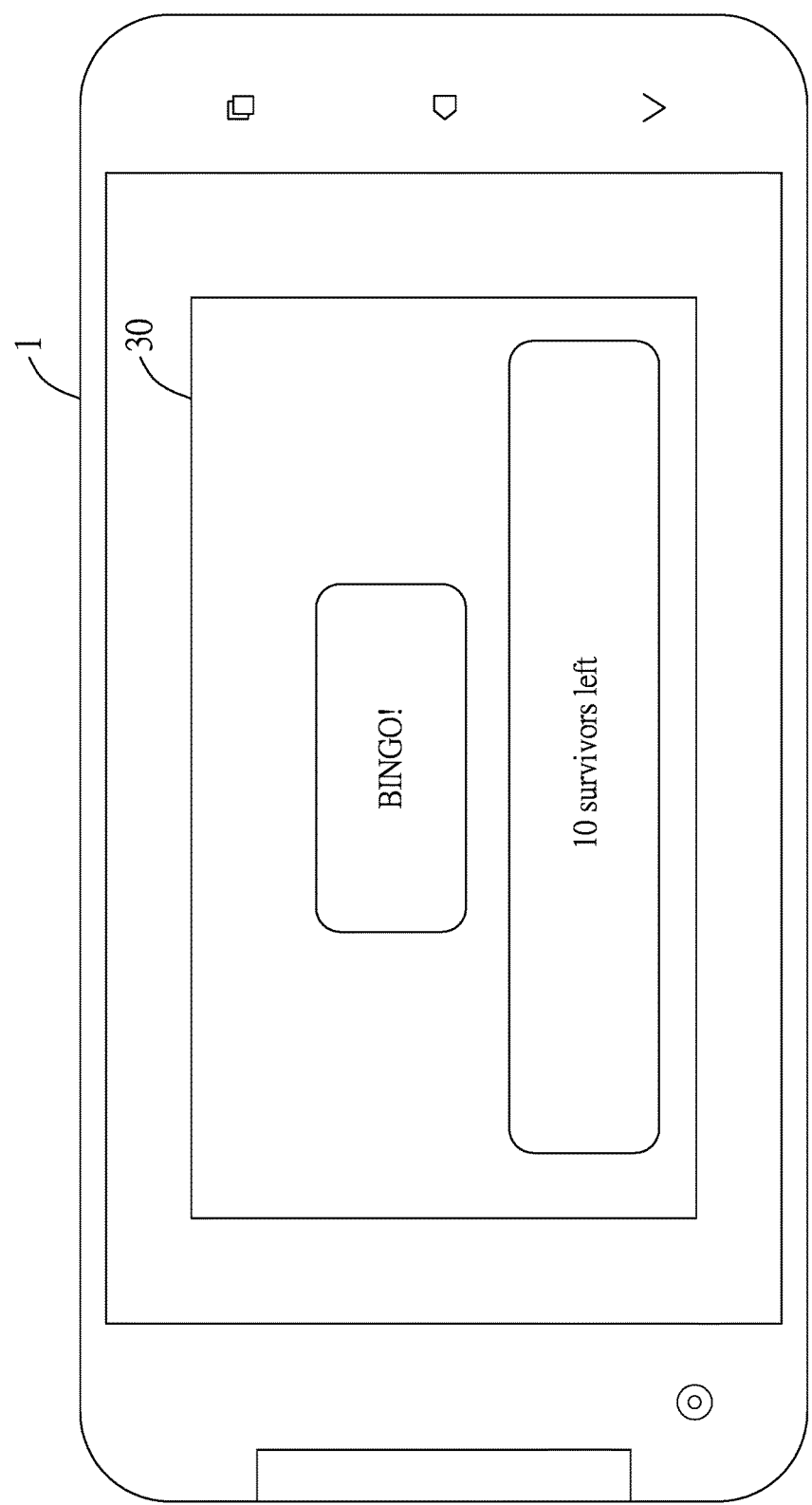

Referring to FIG. 7, in a knockout competition elimination type of exam (or game), the control unit 10 controls the display unit 15 to show, in the interface 30, a number of survivors in the exam every time the user selects the right answer.

Figure 14:
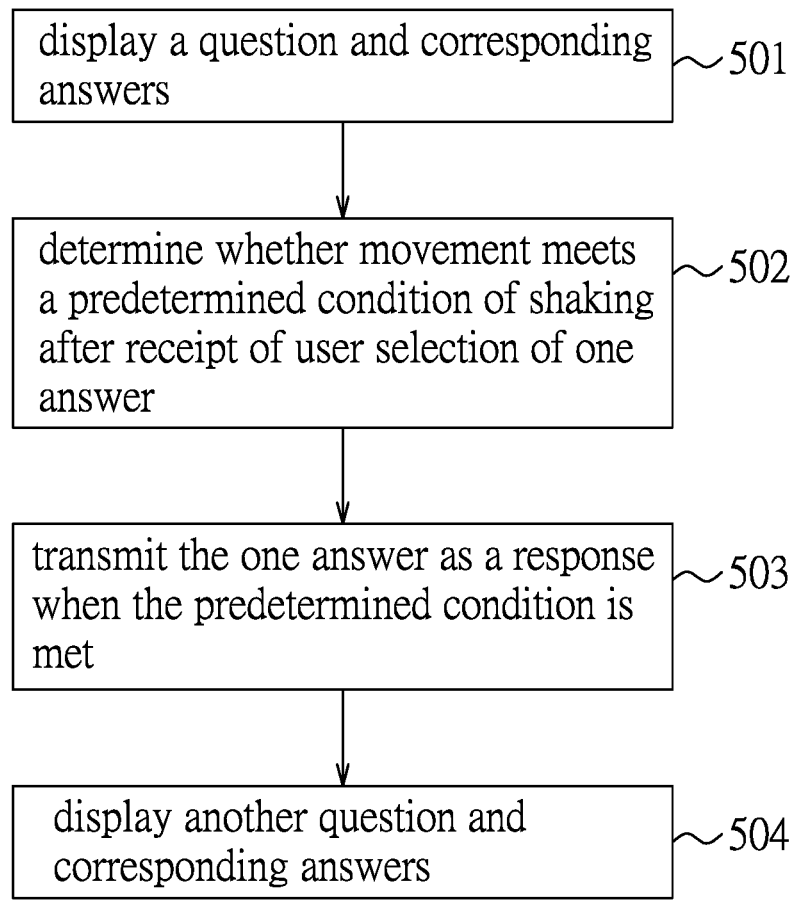
FIG. 14 is a flow chart illustrating a method according to the first embodiment.

A process flow of a method to be implemented by an electronic device according to the first embodiment is depicted in FIG. 14. In step 501, a question and a plurality of answers corresponding to the question are displayed. In step 502, after receipt of user selection of one of the answers, it is determined whether movement of the electronic device 1 meets a predetermined condition of shaking. In step 503, when it is determined in step 502 that the movement of the electronic device 1 meets the predetermined condition, said one of the answers is transmitted. Then, in step 504, another question and a plurality of answers corresponding to said another question are displayed. It is noted herein that meanwhile, position information associated with a position of the electronic device 1 may be transmitted in some embodiments.

Figure 8:
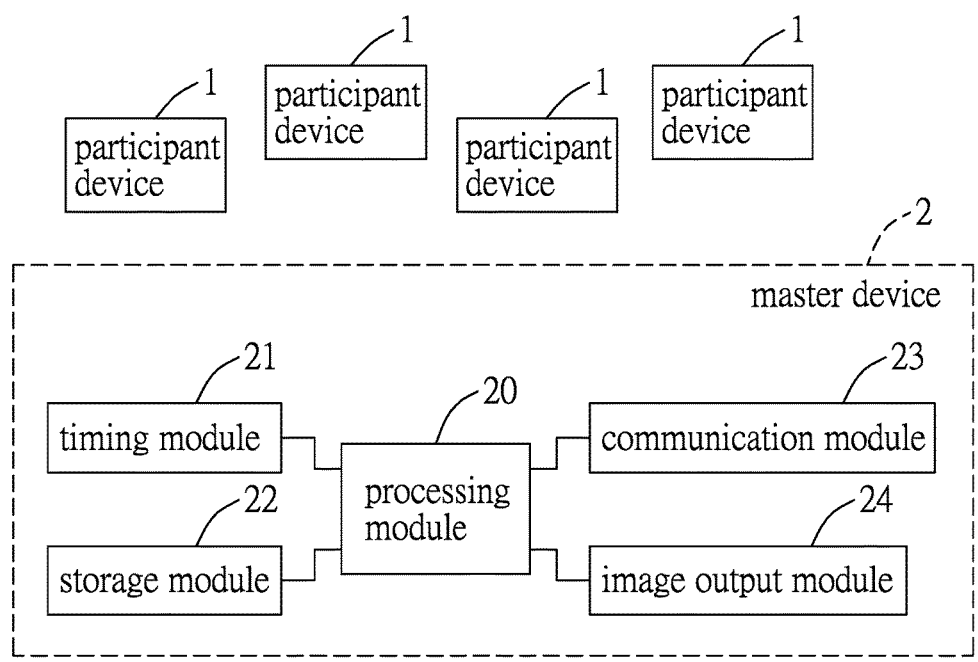
FIG. 8 is a block diagram illustrating an electronic testing system according to a second embodiment of the disclosure.

Referring to FIG. 8, a second embodiment according to this disclosure is described below. An electronic testing system according to the second embodiment includes a master device 2 and a plurality of participant devices 1 (FIG. 8 shows four participant devices) for different users. Each of the participant devices 1 may be embodied like the electronic device 1 (see FIG. 1) described above in connection with the first embodiment to have similar components, and may communicate with the master device 2 in a similar manner as previously described. Detailed descriptions in this regard are not repeated herein for the sake of brevity. It is noted that the control unit 16 of each participant device 1 is configured to control the communication unit 16 to transmit a selected one of the answers as a response to the master device 2 when it is determined that the movement of the participant device 1 meets the predetermined condition. It is noted that herein, each participant device 1 may further include a positioning unit 13 (see FIG. 1). The positioning unit 13 is configured to generate position information associated with a position of the participant device 1. Further, the control unit 10 of each participant device 1 is configured to control the positioning unit 13 to transmit the position information to the master device 2 via the communication unit 15.

The master device 2 may be a remote device, a server, etc. In the second embodiment, the master device 2 includes a processing module 20, a timing module 21, a storage module 22, a communication module 23, and an image output module 24. The storage module 22 is configured to store a correct answer corresponding to at least one question. The storage module 22 may be an HDD, a flash memory, etc. The processing module 20 is electrically coupled to the timing module 21, the storage module 22, the communication module 23, and the image output module 24. The processing module 20 is configured to receive the responses transmitted by the participant devices 1 via the communication module 23, and to determine whether each of the responses matches the correct answer so as to determine a score for one of the participant devices 1 from which the response is received. The processing module 20 may be a microprocessor, an arithmetic & logic circuit, etc.

For a sudden death type game, the master device 2 determines one of the participant devices 1 to be a winning device when the response from the one of the participant devices 1 is received the earliest among those of the responses that match the correct answer, and determines each of the rest of the participant devices 1 to be a losing device.

In another example, the master device 2 may be a website platform at which users (or the participant devices 1 handled by the users) may make registrations, and may store a plurality of questions, answers (namely answer options) corresponding to each question, and the correct answer corresponding to each question. The questions along with the answer options are transmitted from the master device 2 to each participant device 1 via the Internet, and the responses are also transmitted from the participant devices 1 to the master device 2 via the Internet.

Figure 11:
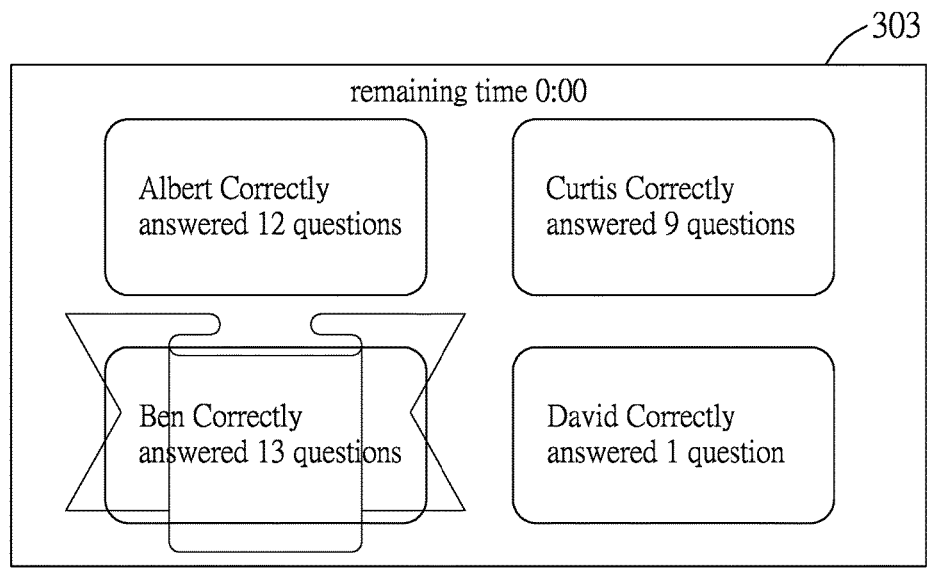

Referring to FIG. 11, in a time-trials type game, the timing module 21 is configured to count a predetermined time. After the timing module 21 has counted the predetermined time (both counting-down and counting-up work), the processing module 20 controls the image output module 24 to display an interface 303 that shows information indicating whether the response transmitted by each of the participant devices 1 matches the correct answer and an accumulated number of correctly answered questions of each of the users of the participant devices 1.

Figure 12:
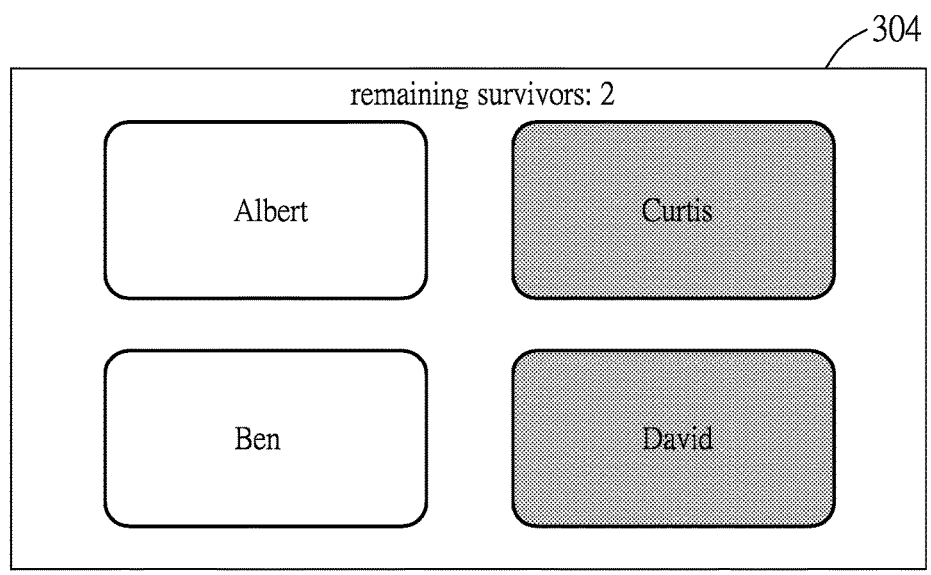

Referring to FIG. 12, in a knockout competition type game, the processing module 20 is configured to control the image output module 24 to display an interface 304 that shows information indicating the users (or participant devices 1) that still survive as the game progresses according to the response transmitted by each of the participant devices 1, and also shows a total number of remaining survivors. For example, the white color block means that the user still survives, and the gray color block means that the user has been eliminated.

Referring to FIG. 9, as another example, the master device 2 is configured to receive the position information from the participant devices 1, to generate an interface 301 according to the position information and the responses received from the participant devices 1 to indicate a (relative) position of each of the participant devices 1 and to indicate whether a response is received from each of the participant devices 1, and to control the image output module 24 to display the interface 301. In this example, there are thirty seats arranged into five columns and six rows. Each of the users occupies a respective seat and uses a respective participant device 1 to participate in the game. The image output module 24 of the master device 2 may be a digital signage, a projector, etc. The interface 301 contains a plurality of blocks corresponding respectively to the participant devices 1 with relative positions of the blocks corresponding to relative positions of the seats occupied by the users handling the participant devices 1 as indicated by the position information, and with a check mark in the block indicating that a response has been received from the corresponding participant device 1.

Referring to FIG. 10, another interface 302 may be displayed by the image output module 24 to indicate who still survives in the game according to the position information and whether the response transmitted by each of the participant devices 1 matches the correct answer, and also shows a total number of remaining survivors. Similar to the interface 301 of FIG. 9, the interface 302 contains a plurality of blocks corresponding respectively to the participant devices 1 with relative positions of the blocks corresponding to relative positions of the seats occupied by the users handling the participant devices 1 as indicated by the position information, and with different colors flagging whether the users (or participant devices 1) still survive. For example, the white color means that the user still survives, and the gray color means that the user has been eliminated. It is noted that the names of the users may be shown in the corresponding blocks in one implementation.

It is noted that in the examples depicted in FIGS. 9 and 10, the position information of each participant device 1 indicates a relative position of the participant device 1. However, the position information may also indicate absolute position in other implementations of this disclosure.

Figure 13:
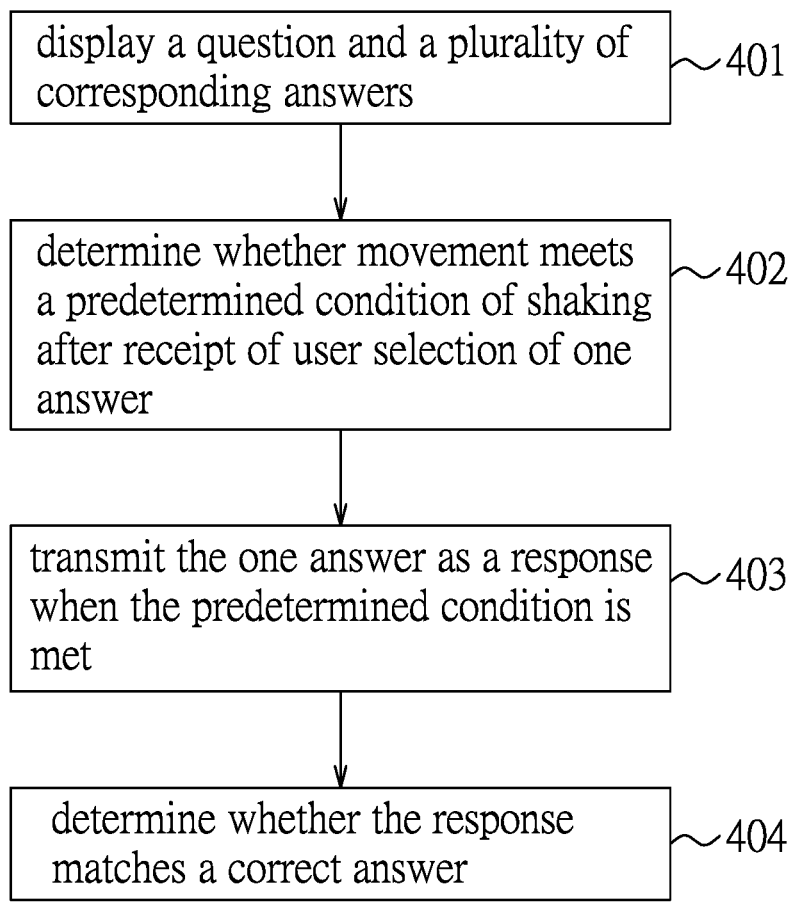
FIG. 13 is a flow chart illustrating a method according to the second embodiment.

Referring to FIG. 13, a method to be implemented by an electronic testing system that includes a plurality of participant devices 1 and a master device 2 according to the second embodiment will be described.

The method includes steps 401-404. In step 401, each of the participant devices 1 displays a question and a plurality of answers corresponding to the question.

In step 402, each of the participant devices 1, after receipt of user selection of one of the answers, determines whether movement of the participant device 1 meets a predetermined condition of shaking. In step 403, each of the participant devices 1, when it is determined in step 402 that the movement of the participant device 1 meets the predetermined condition, transmits the one of the answers as a response to the master device 2. In step 404, the master device 2, upon receipt of the responses from the participant devices 1, determines whether each of the responses matches a correct answer so as to determine a score for the participant devices 1 from which the response is received.

In one example, after step 404, each of the participant devices may display another question and a plurality of answers corresponding to said another question. In one implementation, each of the participant devices 1 may determine whether movement of the participant device 1 meets the predetermined condition, and only displays said another question when it is determined that the movement of the participant device 1 meets the predetermined condition.

In one example, after step 404, the master device 2 may determine one of the participant devices 1 to be a winning device when the response from the one of the participant devices 1 is received the earliest among those of the responses that match the correct answer, and may determine each of the rest of the participant devices 1 to be a losing device.

In one example, the method further includes the steps below. In a first step, each of the participant devices 1 transmits position information associated with a position of the participant device 1 to the master device 2. In a second step, after receiving the position information from the participant devices 1, the master device 2 generates an interface according to the position information and the responses received from the participant devices 1 to indicate position of each of the participant devices 1 and to indicate whether the response transmitted by each of the participant devices matches the correct answer, and displays the interface.

In one example, the method further includes the steps below. In a first step, the master device 2 counts a predetermined time and generates an interface to indicate whether the response transmitted by each of the participant devices 1 matches the correct answer after completion of counting the predetermined time.

In sum, the electronic device 1 and the participant devices 1 are each provided with a mechanism that allows the user-selected answer to be transmitted only when movement of the electronic/participant device 1 meets a predetermined condition of shaking. This mechanism flexibly permits room for re-consideration of the selection by the user without unduly prolonging the progress of an exam, a game, a competition, etc., involving answering of multiple questions.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electronic testing system comprising:
    a master device; and
    a plurality of participant devices, each of which includes
        a display unit configured to display a question and a plurality of answers corresponding to the question,
        an input unit configured to allow user selection of one of the answers,
        a memory unit,
        a sensor unit configured to detect movement of said participant device,
        a communication unit,
        a control unit electrically coupled to said display unit, said input unit, said sensor unit, and said communication unit, and configured to control said memory unit to record said one of the answers and to determine whether the movement of said participant device as detected by said sensor unit meets a predetermined condition of shaking after the user selection is received by said input unit, and to control said communication unit to transmit said one of the answers as a response when it is determined that the movement of said participant device meets the predetermined condition;
    wherein said master device includes a processing module, a communication module, and a storage module configured to store a correct answer corresponding to the question;
    wherein said processing module is configured to receive the responses transmitted by said participant devices via said communication module, and to determine whether each of the responses matches the correct answer so as to determine a score for one of said participant devices from which the response is received.

2. The electronic testing system as claimed in claim 1, wherein said control unit of each of said participant devices is configured to control said display unit to display another question and a plurality of answers corresponding to said another question after said communication unit transmits one of the answers corresponding to the question.

3. The electronic testing system as claimed in claim 1, wherein said processing module of said master device is configured to determine one of said participant devices to be a winning device when the response from said one of said participant devices is received the earliest among those of the responses that match the correct answer, and to determine each of the rest of said participant devices to be a losing device.

4. The electronic testing system as claimed in claim 1, wherein said master device further includes an image output module electrically coupled to said processing module, and each of said participant devices further includes a positioning unit electrically coupled to said control unit, and configured to generate position information based on a position of said participant device, said control unit being configured to control said communication unit to transmit the position information;
    wherein said master device is configured to receive the position information from said participant devices, to generate an interface containing the position information of said participant devices, and to control said image output module to display the interface.

5. The electronic testing system as claimed in claim 1, wherein said master device further includes an image output module electrically coupled to said processing module, and each of said participant devices further includes a positioning unit electrically coupled to said control unit, and configured to generate position information based on a position of said participant device, said control unit being configured to control said communication unit to transmit the position information;

wherein said master device is configured to receive the position information from said participant devices, to generate an interface according to the position information and responses received from said participant devices to indicate position of each of said participant devices and to indicate whether the response transmitted by each of said participant devices matches the correct answer, and to control said image output module to display the interface.

6. The electronic testing system as claimed in claim 5, wherein the interface contains a plurality of blocks corresponding respectively to said participant devices with relative positions of the blocks corresponding to relative positions of said participant devices as indicated by the position information and with the blocks having different colors to indicate whether the response transmitted by each of said participant devices matches the correct answer, each of the blocks having thereon a name of a user of the corresponding one of said participant devices.

7. The electronic testing system as claimed in claim 6, wherein said master device further includes a timing module electrically coupled to said processing module, and configured to count a predetermined time, and said master device is configured to generate the interface to indicate whether the response transmitted by each of said participant devices matches the correct answer after said timing module has counted the predetermined time.

8. A method to be implemented by an electronic testing system that includes a plurality of participant devices and a master device, the method comprising the steps of:
(a) by each of the participant devices, displaying a question and a plurality of answers corresponding to the question;
(b) by each of the participant devices, after receipt of user selection of one of the answers, determining whether movement of the electronic device meets a predetermined condition of shaking;
(c) by each of the participant devices, when it is determined in step (b) that the movement of the electronic device meets the predetermined condition, transmitting said one of the answers as a response to the master device;
(d) by the master device, upon receipt of the responses from the participant devices, determining whether each of the responses matches a correct answer so as to determine a score for one of the participant devices from which the response is received.

9. The method as claimed in claim 8, further comprising, after step (c), the step of:
(e) by each of the participant devices, displaying another question and a plurality of answers corresponding to said another question.

10. The method as claimed in claim 9, further comprising after step (c), the step of:
(f) by each of the participant devices, determining whether movement of the participant device meets the predetermined condition; and
wherein step (e) is performed only when it is determined in step (f) that the movement of the participant device meets the predetermined condition.

11. The method as claimed in claim 8, further comprising, after step (d), the step of:
by the master device, determining one of the participant devices to be a winning device when the response from said one of the participant devices is received the earliest among those of the responses that match the correct answer, and determining each of the rest of the participant devices to be a losing device.

12. The method as claimed in claim 8, further comprising the steps of:
by each of the participant devices, transmitting position information associated with a position of the participant device; and
by the master device, after receiving the position information from the participant devices, generating and displaying an interface containing the position information of the participant devices.

13. The method as claimed in claim 8, further comprising the steps of:
by each of the participant devices, transmitting position information associated with a position of the participant device; and
after step (d), by the master device, after receiving the position information from the participant devices, generating an interface according to the position information and the responses received from the participant devices to indicate position of each of the participant devices and to indicate whether the response transmitted by each of the participant devices matches the correct answer, and displaying the interface.

14. The method as claimed in claim 8, further comprising the steps of:
(g) by the master device, counting a predetermined time; and
(h) by the master device, generating an interface to indicate whether the response transmitted by each of the participant devices matches the correct answer after completion of step (g).

\* \* \* \* \*